United States Patent
Seo et al.

(10) Patent No.: US 8,264,644 B2
(45) Date of Patent: Sep. 11, 2012

(54) COLOR FILTER SUBSTRATE FOR IN-PLANE SWITCHING MODE LIQUID CRYSTAL DISPLAY DEVICE AND METHOD OF FABRICATING THE SAME

(75) Inventors: Kyung-Han Seo, Gyeongsangbuk-do (KR); Chul-Woo Kim, Gyeongsangbuk-do (KR); Yong-Woo Yoo, Gyeonggi-do (KR); Mun-Gi Park, Gyeonggi-do (KR); Ho-Su Kim, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 421 days.

(21) Appl. No.: 12/606,621

(22) Filed: Oct. 27, 2009

(65) Prior Publication Data

US 2010/0141876 A1 Jun. 10, 2010

(30) Foreign Application Priority Data

Dec. 10, 2008 (KR) .......................... 10-2008-0125211

(51) Int. Cl.
*G02F 1/1335* (2006.01)
(52) U.S. Cl. ....................................................... 349/106
(58) Field of Classification Search .................. 349/109
See application file for complete search history.

(56) References Cited

U.S. PATENT DOCUMENTS

| | | | |
|---|---|---|---|
| 6,525,791 B1 | 2/2003 | Tsuda et al. | |
| 6,863,947 B2 * | 3/2005 | Kaneko | 428/848.6 |
| 7,298,440 B2 * | 11/2007 | Sonoda et al. | 349/114 |
| 7,425,392 B2 * | 9/2008 | Nordquist et al. | 430/5 |
| 7,651,640 B2 * | 1/2010 | Fukatani et al. | 252/519.51 |
| 7,745,342 B2 * | 6/2010 | Kim et al. | 438/720 |
| 7,965,354 B2 * | 6/2011 | Lee et al. | 349/106 |
| 2008/0252831 A1 | 10/2008 | Lee et al. | |

FOREIGN PATENT DOCUMENTS

| | | |
|---|---|---|
| KR | 10-2002-0028374 | 4/2002 |
| KR | 10-2005-0083433 | 8/2005 |
| KR | 10-2008-0001900 | 1/2008 |

\* cited by examiner

*Primary Examiner* — James Dudek
(74) *Attorney, Agent, or Firm* — Morgan, Lewis & Bockius LLP

(57) ABSTRACT

A color filter substrate for an in-plane switching mode liquid crystal display device includes a first rear side electrode on a first surface of a substrate and formed of a first transparent conductive material including zinc oxide (ZnO) and at least two compounds having second or fourth valence, the first rear side electrode having a first thickness; a black matrix having a lattice shape and a plurality of openings in the lattice shape, the black matrix disposed on a second surface, which is opposite to the first surface, of the substrate; a color filter layer in the plurality of openings; and an overcoat layer on the black matrix and the color filter layer.

16 Claims, 7 Drawing Sheets

COLOR FILTER SUBSTRATE FOR IN-PLANE SWITCHING MODE LIQUID CRYSTAL DISPLAY DEVICE AND METHOD OF FABRICATING THE SAME

The present application claims the benefit of Korean Patent Application No. 10-2008-0125211 filed in Korea on Dec. 10, 2008, which is hereby incorporated by reference.

BACKGROUND OF THE INVENTION

1. Field of the Invention

The present invention relates to an in-plane switching (IPS) mode liquid crystal display (LCD) device and more particularly to a color filter substrate having reduced production cost and an improved brightness property and a method of fabricating the array substrate.

2. Discussion of the Related Art

As the society has entered in earnest upon an information age, flat panel display devices, which have excellent capabilities of a thin profile, light weight and low power consumption, and so on, are introduced. Among these devices, LCD devices are widely used for notebook computers, monitors, TV, and so on, because of their high contrast ratio and characteristics adequate to display moving images.

Generally, the LCD device includes first and second substrates, which face each other, and a liquid crystal layer, which includes liquid crystal molecules, interposed therebetween. First and second electrodes are respectively formed on the first and second substrates. When voltages are applied to the first and second electrodes to generate an electric field, the liquid crystal layer is driven by the electric field such that images can be displayed by controlling light transmissivity.

FIG. 1 is an exploded perspective view of the related art LCD device. The LCD device 1 includes first and second substrates 12 and 22, and a liquid crystal layer 30. The first and second substrates 12 and 22 face each other, and the liquid crystal layer 30 is interposed therebetween.

The first substrate 12 includes a gate line 14, a data line 16, a TFT "Tr", and a pixel electrode 18. The first substrate 12 including these elements is referred to as an array substrate 10. The gate line 14 and the data line 16 cross each other such that a region is formed between the gate and data lines 14 and 16 and is defined as a pixel region "P". The TFT "Tr" is formed at a crossing portion of the gate and data lines 14 and 16, and the pixel electrode 18 is formed in the pixel region "P" and connected to the TFT "Tr".

The second substrate 22 includes a black matrix 25, a color filter layer 26, and a common electrode 28. The second substrate 22 including these elements is referred to as a color filter substrate 20. The black matrix 25 has a lattice shape to cover a non-display region of the first substrate 12, such as the gate line 14 and the data line 16 on the first substrate 12. A light leakage in the non-display region is blocked by the black matrix 25. The color filter layer 26 includes first, second, and third sub-color filters 26a, 26b, and 26c. Each of the sub-color filters 26a, 26b, and 26c has one of red, green, and blue colors R, G, and B and corresponds to the each pixel region "P". The common electrode 28 is formed on the black matrix 25 and the color filter layers 26 and over an entire surface of the second substrate 22.

As mentioned above, the LCD device 1 includes the color filter substrate 20, where the common electrode 28 is formed, the array substrate 10, where the pixel electrode 18 is formed, and the liquid crystal layer 30 interposed therebetween. The liquid crystal layer 30 is driven by a vertical electric field induced between the common electrode 28 and the pixel electrode 18. The LCD device 1 has advantages of transmissivity and aperture ratio. However, since the liquid crystal layer is driven by the vertical electric field, there is a disadvantage of a viewing angle.

An in-plane switching (IPS) mode LCD device may be used to resolve the above-mentioned limitations. FIG. 2 is a cross-sectional view of the related art IPS mode LCD device. As shown in FIG. 2, the IPS mode LCD device 40 includes first and second substrates 50 and 60, and a liquid crystal layer 70 interposed therebetween. Both a common electrode 55 and a pixel electrode 58 are formed on the first substrate 50 such that the liquid crystal layer 70 is driven by a horizontal electric field L induced between the common and pixel electrodes 55 and 58.

When the voltage is applied to the IPS mode LCD device 40, liquid crystal molecules above the common electrode 55 and the pixel electrode 58 are unchanged. But, liquid crystal molecules between the common electrode 55 and the pixel electrode 58 are horizontally arranged due to the horizontal electric field L. Since the liquid crystal molecules are arranged by the horizontal electric field L, the IPS mode LCD device 40 has a characteristic of a wide viewing angle.

A seal pattern (not shown) is formed along edges of the first and second substrates 50 and 60 after forming the above elements are formed on the first and second substrates 50 and 60. Then, the liquid crystal is injected to a space between the first and second substrates 50 and 60, and the first and second substrates 50 and 60 are attached to each other such that the IPS mode LCD device 40 is fabricated. When forming the elements on the first and second substrates 50 and 60, the first and second substrates 50 and 60 is disposed on a stage of a processing apparatus. In this case, static electricity is generated on the first and second substrates 50 and 60. Since there are electric lines and electrodes, which are formed of a metallic material, on the first substrate 50, the static electricity can be easily removed. However, since there is no element of a conductive material on the second substrate 60 for the IPS mode LCD device, there are damages on the second substrate 60 due to the static electricity. These problems are also generated in the end products. Since there is no element of a conductive material on the second substrate 60, which is referred to as a color filter substrate, the electric charge resulted from the static electricity can not be easily removed.

To resolve these problems, after a rear side electrode (not shown) is formed on a rear surface of the second substrate 60 by depositing a transparent conductive material, such as indium-tin-oxide (ITO) and indium-zinc-oxide (IZO), processes are performed on the second substrate 60. However, since ITO or IZO is very expensive, production costs are increased.

In addition, there is another problem during a rework process for the color filter substrate. When a problem is generated in the color filter layer, the black matrix or the overcoat layer, the rework process is required. ITO and IZO are not affected by an etchant for removing the color filter layer or the black matrix, while ITO and IZO are affected by an etchant from removing the overcoat layer. When a problem is generated in the color filter layer, a process for the color filter substrate is performed after removing the color filter layer and the black matrix. However, when a problem is generated in the overcoat layer, the rear side electrode of ITO or IZO is also partially removed during a removing process for the overcoat layer. Accordingly, a process for completely removing the rear side electrode is required such that production costs are also increased.

SUMMARY OF THE INVENTION

Accordingly, the present invention is directed to a color filter substrate for an IPS mode LCD device and a method of fabricating the same that substantially obviates one or more of the problems due to limitations and disadvantages of the related art.

An object of the present invention is to provide a color filter substrate for an IPS mode LCD device being capable of preventing damages from static electricity.

An object of the present invention is to provide a fabricating process of a color filter substrate for an IPS mode LCD device being capable of reducing production costs.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a color filter substrate for an in-plane switching mode liquid crystal display device includes a first rear side electrode on a first surface of a substrate and formed of a first transparent conductive material including zinc oxide (ZnO) and at least two compounds having second or fourth valence, the first rear side electrode having a first thickness; a black matrix having a lattice shape and a plurality of openings in the lattice shape, the black matrix disposed on a second surface, which is opposite to the first surface, of the substrate; a color filter layer in the plurality of openings; and an overcoat layer on the black matrix and the color filter layer.

In another aspect of the present invention, a method of fabricating a color filter substrate for an in-plane switching mode liquid crystal display device includes forming a first rear side electrode on a first surface of a substrate and formed of a first transparent conductive material including zinc oxide (ZnO) and at least two compounds having second or fourth valence, the first rear side electrode having a first thickness; forming a black matrix having a lattice shape and a plurality of openings in the lattice shape, the black matrix disposed on a second surface, which is opposite to the first surface, of the substrate; forming a color filter layer in the plurality of openings; and forming an overcoat layer on the black matrix and the color filter layer.

In another aspect of the present invention, a rework process of a color filter substrate for an in-plane switching mode liquid crystal display device includes forming a first rear side electrode on a first surface of a substrate and formed of a first transparent conductive material including zinc oxide (ZnO) and at least two compounds having second or fourth valence, the first rear side electrode having a first thickness; forming a black matrix having a lattice shape and a plurality of openings in the lattice shape, the black matrix disposed on a second surface, which is opposite to the first surface, of the substrate; forming a color filter layer in the plurality of openings; forming an overcoat layer on the black matrix and the color filter layer; and dipping the substrate, where the first rear side electrode, the black matrix, the color filter layer and the overcoat layer are formed, into a potassium hydroxide (KOH)-based stripping solution to completely remove the first rear side electrode, the black matrix, the color filter layer and the overcoat layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments, examples of which are illustrated in the accompanying drawings.

FIGS. 3A to 3F are cross-sectional views showing a fabricating process of a color filter substrate for an IPS mode LCD device according to a first embodiment of the present invention.

Figure 1:
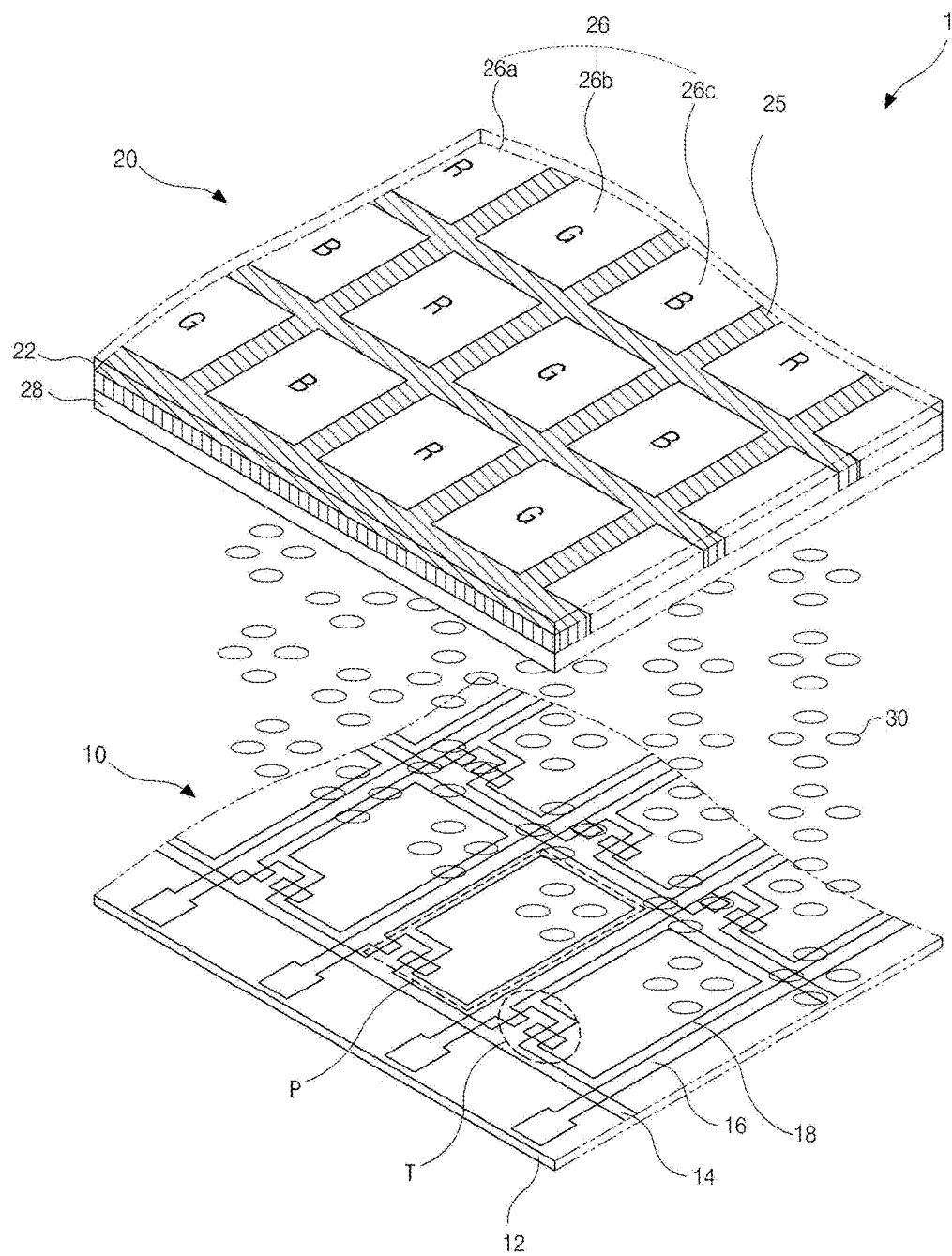
FIG. 1 is an exploded perspective view of the related art LCD device.
Figure 2:
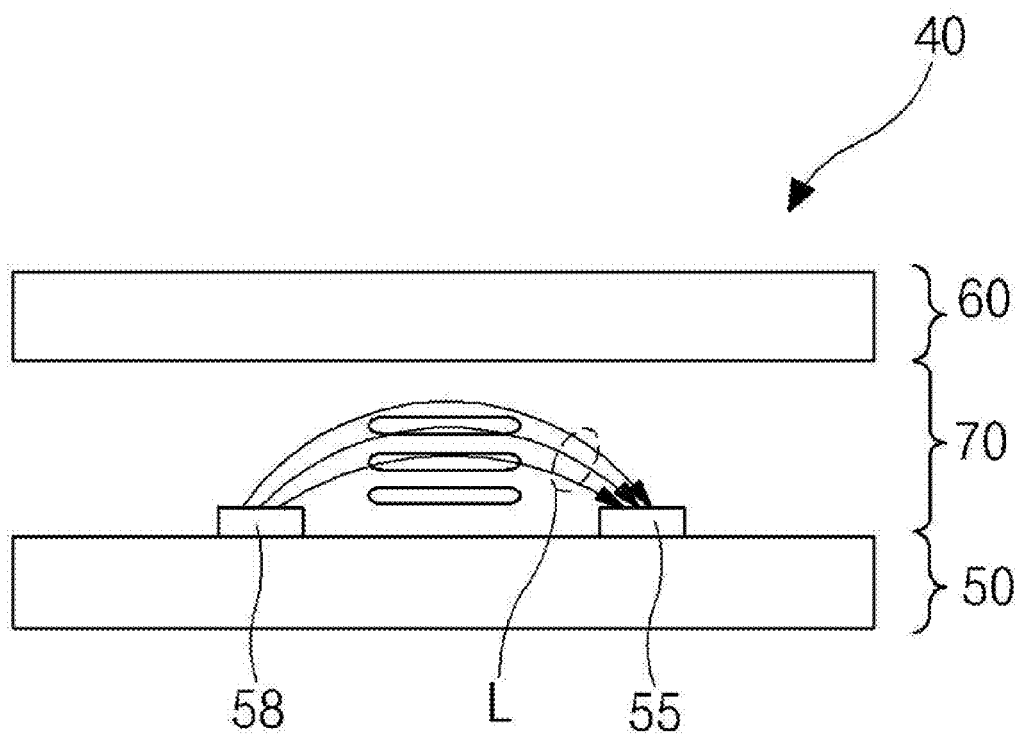
FIG. 2 is a cross-sectional view of the related art IPS mode LCD device.
Figure 3A:
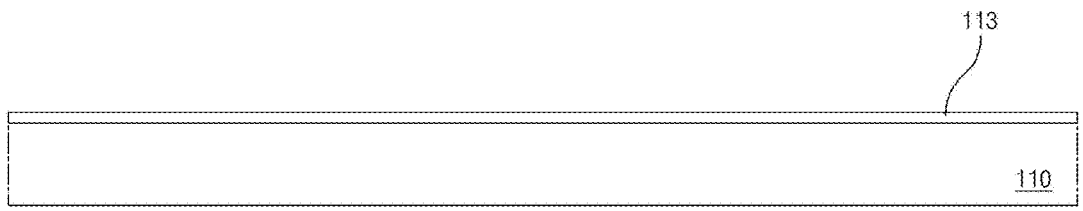
FIGS. 3A to 3F are cross-sectional views showing a fabricating process of a color filter substrate for an IPS mode LCD device according to a first embodiment of the present invention.

In FIG. 3A, a substrate 110 is disposed in a chamber (not shown) of a sputtering apparatus, and a rear side electrode 113 is formed on a first surface of the substrate 110 by a series magnetron sputtering process. The rear side electrode 113 may have a thickness of about 200 to about 300 angstroms. The rear side electrode 113 is formed of a transparent conductive material including zinc oxide (ZnO) as a main component. ZnO is low-priced material. The transparent conductive material of the rear side electrode 113 further includes at least two compounds having second or fourth valence. For example, two or three compounds having second or fourth valence are added to ZnO. The compounds having second or fourth valence may include aluminum oxide ($Al_2O_3$), gallium oxide ($Ga_2O_3$) and calcium oxide (CaO). $Al_2O_3$ of about 1 to about 3 weight %, $Ga_2O_3$ of about 0.2 to about 2 weight % and CaO of about 0.01 to about 0.05 weight % are added to ZnO. CaO may not be included.

When the transparent conductive material for the rear side electrode 113 includes four components, ZnO, $Al_2O_3$, $Ga_2O_3$ and CaO respectively have about 94.95 to about 98.79 weight %, about 1 to about 3 weight %, about 0.2 to 2 weight %, and about 0.01 to about 0.05 weight %. Alternatively, when the transparent conductive material for the rear side electrode 113 includes three components, ZnO, $Al_2O_3$ and $Ga_2O_3$ respectively have about 95 to about 98.8 weight %, about 1 to about 3 weight % and about 0.2 to 2 weight %.

The component having second or fourth valence is added to improve a target characteristic for sputtering and a conductive property. For example, when the rear side electrode 113 is formed of a transparent conductive material including ZnO of 96.99 weight %, $Al_2O_3$ of 2 weight %, $Ga_2O_3$ of 1 weight % and CaO of 0.01 weight % with a thickness of about 200 angstroms, the rear side electrode 113 has an average transmissivity of 97.8% with respect to light having a wavelength range of 400 nm to 700 nm and a specific resistance of $246.8 \ast 10^{-4}$ $\Omega cm^{-1}$. Alternatively, when the rear side electrode 113 is formed the above transparent conductive material with a thickness of 300 angstroms, the rear side electrode 113 has an average transmissivity of 96.7% with respect to light having a wavelength range of 400 nm to 700 nm and a specific resistance of $34.6*10^{-4}$ $\Omega$cm$^{-1}$.

On the other hand, when rear side electrode 113 is formed of ITO with a thickness of 200 angstroms, the rear side electrode 113 has an average transmissivity of 96.8% with respect to light having a wavelength range of 400 nm to 700 nm and a specific resistance of $3.7*10^{-4}$ $\Omega$cm$^{-1}$.

In comparison to properties in the rear side electrode including ZnO as a main component with the rear side electrode of ITO, when they have the same thickness, transmissivity is improved by about 1.1%. Meanwhile, the conductive property of the rear side electrode in the present invention is a little degraded since the specific resistance of the rear side electrode of ITO is smaller than that of the rear side electrode of the present invention. However, the rear side electrode for controlling the static electricity is required to have a specific resistance smaller than $500*10^{-4}$ $\Omega$cm$^{-1}$. Accordingly, there is no problem even if the rear side electrode in the present invention has a larger specific resistance with compared to the rear side electrode of ITO. As mentioned above, the rear side electrode of the present invention has no problem in a specific resistance to control the static electricity and an advantage of transmissivity. In addition, since ZnO is cheaper than ITO or IZO, the color filter substrate in the present invention has an advantage in production cost.

Moreover, a sputtering process for ITO or IZO requires pure oxygen gas as well as argon gas, while a sputtering process for a transparent conductive material including ZnO as a main component only requires argon gas. Accordingly, production cost is further reduced.

Figure 3B:
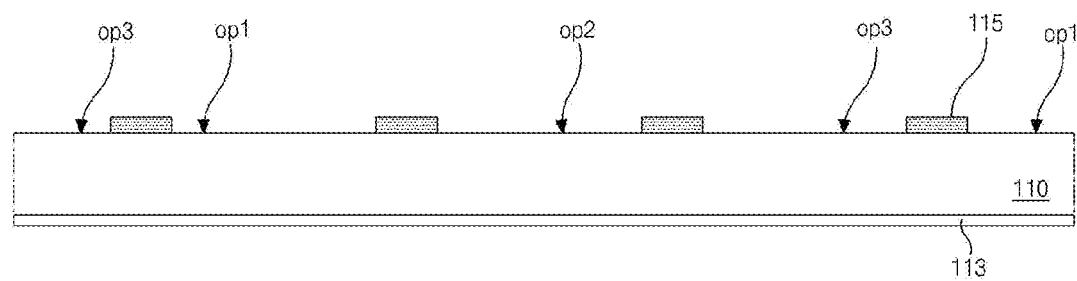

In FIG. 3B, a black organic insulating layer (not shown) is formed on a second surface of the substrate 110 where the rear side electrode 113 is formed. The rear side electrode 110 and the black organic insulating layer are formed on opposing surface of the substrate 110. The black organic insulating layer is formed of a black resin or epoxy resin having a black color. The black organic insulating layer has a photo-sensitive property.

A first exposing mask (not shown), which includes a transmissive portion and a blocking portion, is disposed over the black organic insulating layer. The black organic insulating layer is exposed using the first exposing mask and developed to form a black matrix 115 having a lattice shape and including first to third openings op1, op2 and op3. The first to third openings op1, op2 and op3 may be alternately arranged with each other.

Figure 3C:
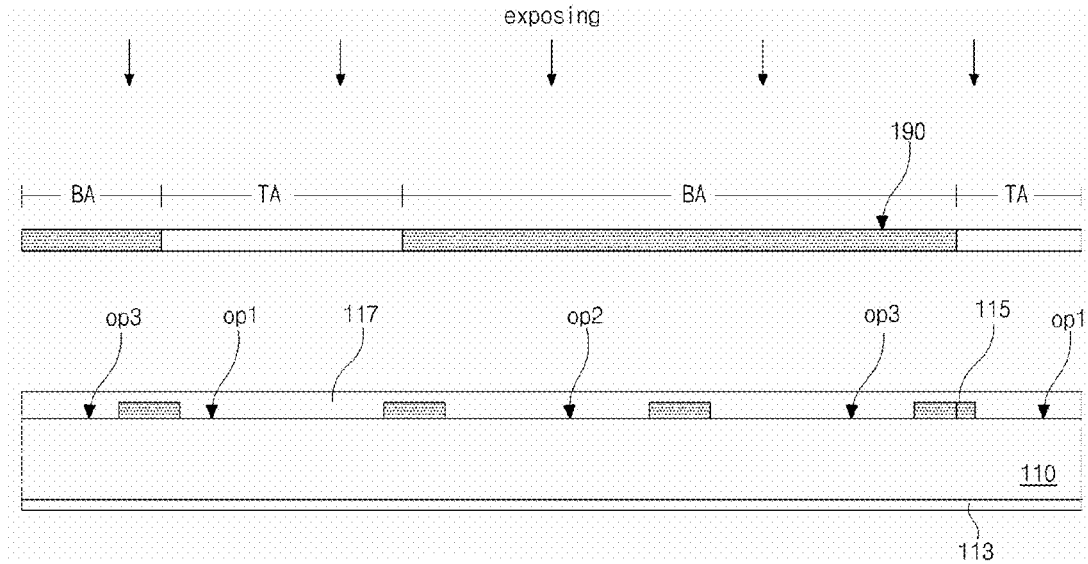

Next, in FIG. 3C, a red resist material is coated on the black matrix 115 to form a red resist material layer 117. A second exposing mask 190, which includes a transmissive portion TA and a blocking portion BA, is disposed over the red resist material layer 117, and an exposing process is performed.

Since a negative type material is used for the color resist material layer, for example, the red resist material layer 117, the transmissive portion TA of the second exposing mask 190 corresponds to a region where a red color filter pattern 120*a* (of FIG. 3D) will be formed.

Figure 3D:
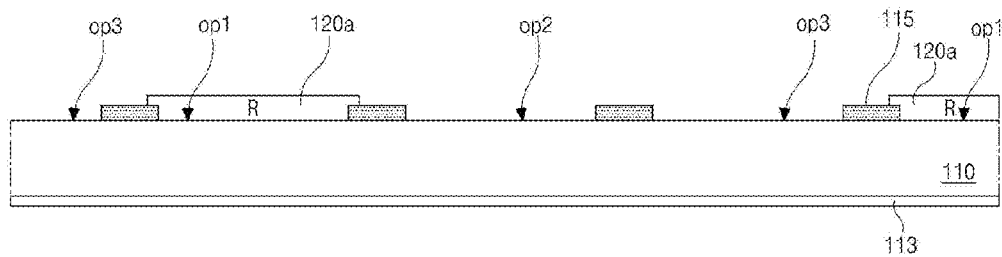

Next, in FIG. 3D, the exposed red resist material layer 117 (of FIG. 3C) is developed to form the red color filter pattern 120*a* in the first opening op1. Edges of the red color filter pattern 120*a* may partially overlap the black matrix 115.

Figure 3E:
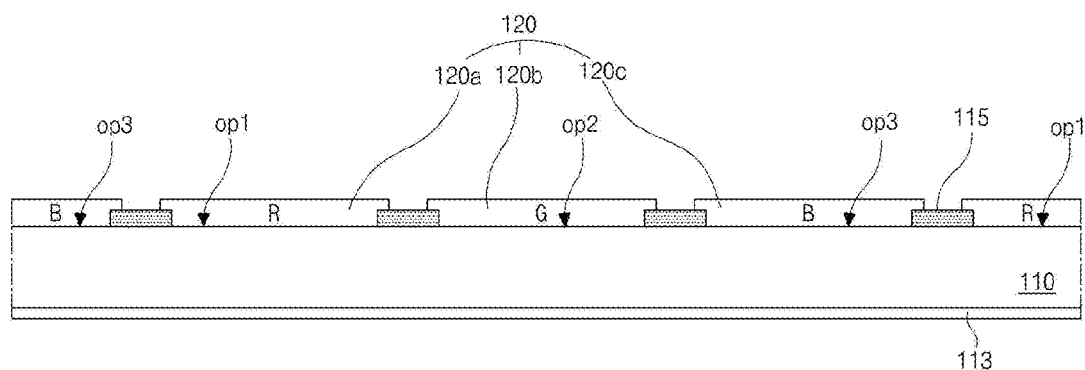

Next, in FIG. 3E, a green color filter pattern 120*b* and a blue color filter pattern 120*c* are respectively formed in the second and third openings op2 and op3 by the same fabricating processes for the red color filter pattern 120*a*. The red, green and blue color filter patterns 120*a*, 120*b* and 120*c* constitute a color filter layer 120 on the substrate 110. Namely, the red, green and blue color filter patterns 120*a*, 120*b* and 120*c* are respectively disposed in the first to third openings op1, op2 and op3 of the black matrix 115 having the lattice shape. The red, green and blue color filter patterns 120*a*, 120*b* and 120*c* may be alternately arranged with each other. As the red color filter pattern 120*a* does, edges of the green and blue color filter patterns 120*b* and 120*c* may also partially overlap the black matrix 115. The red, green and blue color filter patterns 120*a*, 120*b* and 120*c* are formed of an inorganic insulating material.

Figure 3F:
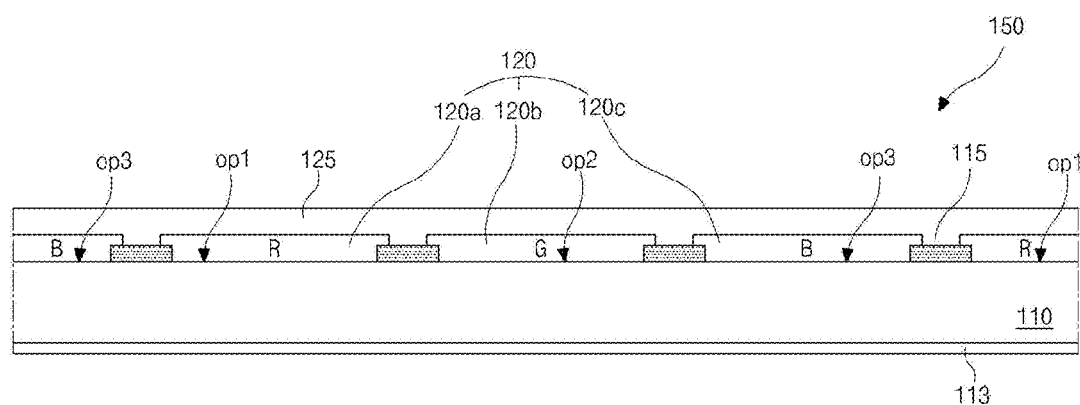

Next, in FIG. 3F, a colorless transparent organic insulating material, such as photo-acryl, is coated on the color filter layer 120 and black matrix 115 to form an overcoat layer 125 such that a color filter substrate 150 for an IPS mode LCD device according to the present invention is fabricated. The overcoat layer 125 is formed to protect the color filter layer 120 and provide a flat surface.

Although not shown, a patterned spacer corresponding to the black matrix 115 may be formed on the overcoat layer 125 by coating and pattering a photosensitive organic insulating material. When a ball spacer is used, the patterned spacer is not required.

If there is a problem in a unit process, for example, a forming process for the black matrix 115, a forming process for the color filter layer 120 or a forming process for the overcoat layer 125, the transparent substrate 110 is reused by a rework process. For example, when there is a problem in the forming process for the black matrix 115, the forming process for the color filter layer 120 or the forming process for the overcoat layer 125, the color filter substrate 150 is transferred into a rework process line such that all of the overcoat layer 125, the color filter layer 120 and the black matrix 115 are removed by the rework process. Even if there are defects on only the forming process for overcoat layer 125, not only the overcoat layer 125 but also the color filter layer 120 and the black matrix 115 are removed.

In the rework process, since the black matrix 115, the color filter layer 120 and the overcoat layer 125 are formed of an organic insulating material, a potassium hydroxide (KOH)-based stripping solution is used for removing the black matrix 115, the color filter layer 120 and the overcoat layer 125. When the black matrix 115, the color filter layer 120 and the overcoat layer 125 is dipped into the KOH-based stripping solution, the ZnO-based rear side electrode 113 also reacts with the KOH-based stripping solution such that the rear side electrode 113 is also removed. Accordingly, a clean transparent substrate 110 is obtained after the rework process.

In the experiment, a rework process is performed onto the substrate where the black matrix, the color filter layer, the overcoat layer, and the rear side electrode are formed, with dipping the substrate into 13% KOH-based stripping solution at 70 Celsius. The ZnO-based material of the rear side electrode partially remains on the transparent substrate after 1 second with dipping the solution, while the ZnO-based material completely removed such that a clean transparent substrate can be obtained.

In other hand, when the rear side electrode is formed of ITO, the ITO very slowly reacts with the KOH-based stripping solution such that very much time is required to completely remove the rear side electrode of ITO after other elements have been completely removed. In addition, since ITO does not react with the KOH-stripping solution, an ITO layer can not be used as a rear side electrode after the rework process. Accordingly, if the rear side electrode is formed ITO, another process in another rework line, where a stripping solution including a strong acid, for example, HCl, is required to completely remove the rear side electrode of ITO.

As a result, in comparison to the related art, a rework process for the color filter substrate for the IPS mode LCD device can be simplified. In addition, since another rework line is not required, there is an advantage in production cost.

Figure 4A:
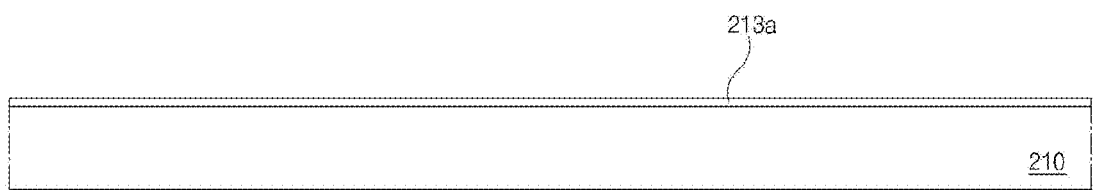
FIGS. 4A to 4C are cross-sectional views showing a fabricating process of a color filter substrate for an IPS mode LCD device according to a second embodiment of the present invention.
Figure 4B:
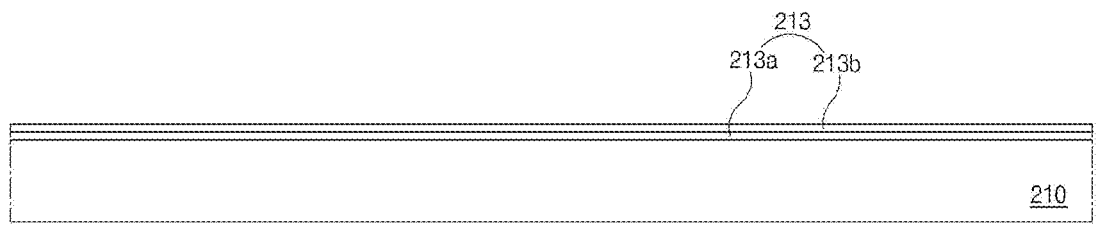
Figure 4C:
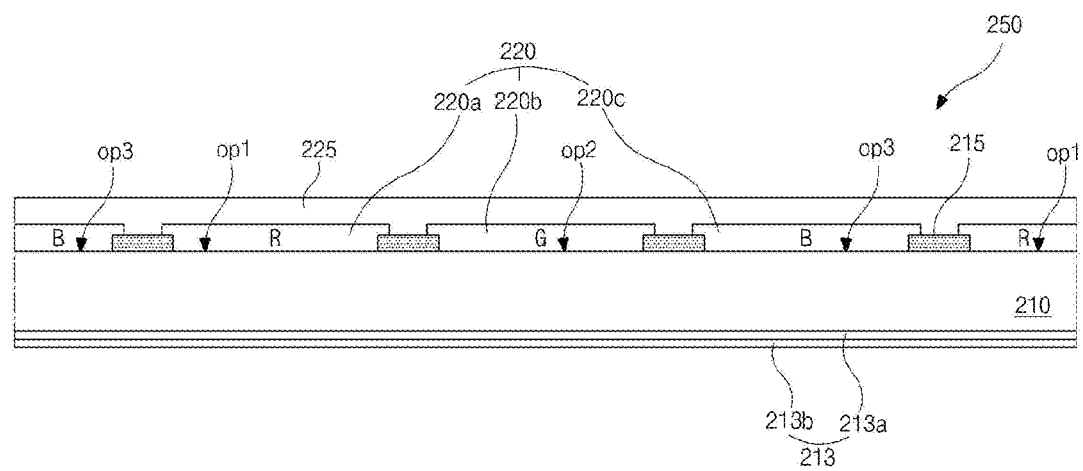

FIGS. 4A to 4C are cross-sectional views showing a fabricating process of a color filter substrate for an IPS mode LCD device according to a second embodiment of the present invention.

In FIG. 4A, a substrate 210 is disposed in a chamber (not shown) of a sputtering apparatus including a target of ITO or IZO, and a first rear side electrode 213a is formed on a first surface of the substrate 210 by a magnetron sputtering process. The first rear side electrode 213a formed of ITO or IZO may have a thickness of about 500 to about 100 angstroms.

In FIG. 4B, the substrate 210, where the first rear side electrode 213a is formed, is transferred into a chamber (not shown) of a sputtering apparatus including a target of ZnO as a main component and two or three compounds having second or fourth valence, and a second rear side electrode 213b is formed on the first rear side electrode 213a by a series magnetron sputtering process. The second rear side electrode 213b may have a thickness of about 100 to about 200 angstroms. For example, a summation of thickness of the first and second rear side electrodes 213a and 213b may be about 200 to about 300 angstroms. The first and second rear side electrodes 213a and 213b constitute a rear side electrode 213.

The compounds having second or fourth valence may include $Al_2O_3$, $Ga_2O_3$ and CaO. $Al_2O_3$ of about 1 to about 3 weight %, $Ga_2O_3$ of about 0.2 to about 2 weight % and CaO of about 0.01 to about 0.05 weight % are added to ZnO. CaO may not be included. When the transparent conductive material for the second rear side electrode 213b includes four components, ZnO, $Al_2O_3$, $Ga_2O_3$ and CaO respectively have about 94.95 to about 98.79 weight %, about 1 to about 3 weight %, about 0.2 to 2 weight %, and about 0.01 to about 0.05 weight %. Alternatively, when the transparent conductive material for the second rear side electrode 213b includes three components, ZnO, $Al_2O_3$ and $Ga_2O_3$ respectively have about 95 to about 98.8 weight %, about 1 to about 3 weight % and about 0.2 to 2 weight %. The processes for forming the first and second rear side electrodes 213a and 213b may be performed in the same sputtering apparatus.

Figure 5:
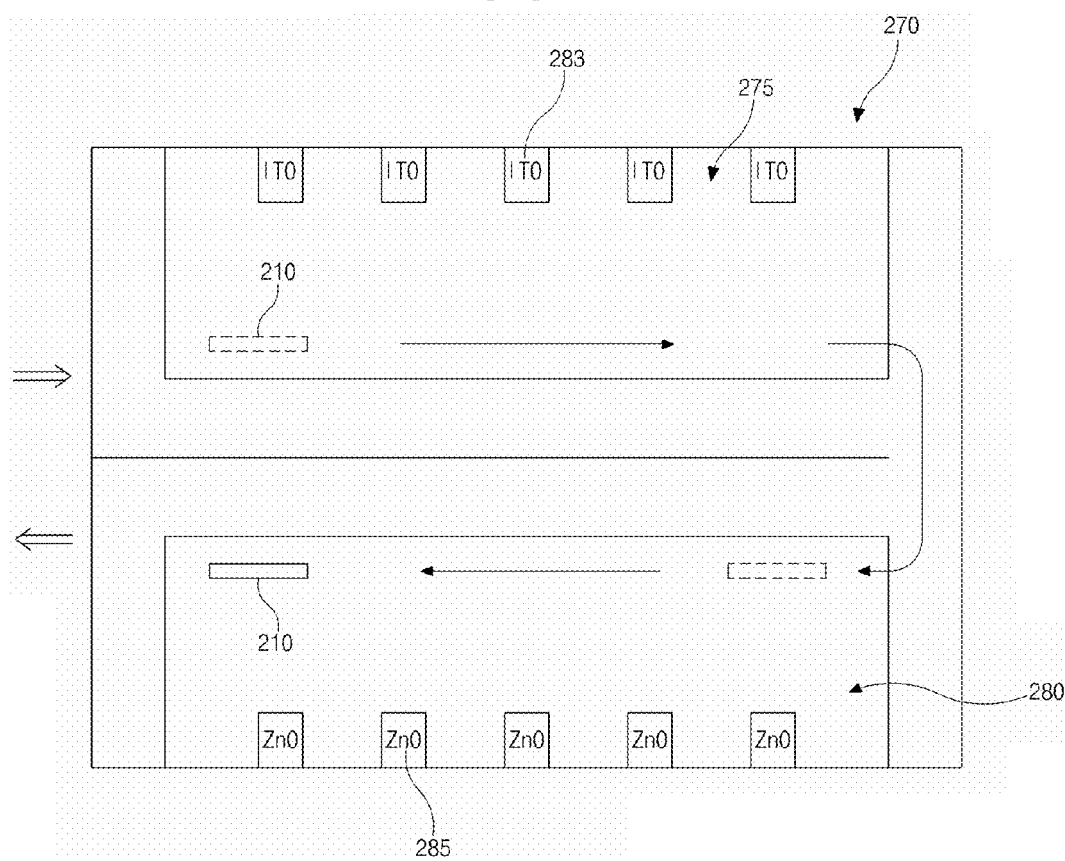
FIG. 5 is a schematic view illustrating a sputtering apparatus for forming a rear side electrode of a color filter substrate for an IPS mode LCD device according to the second embodiment of the present invention.

FIG. 5 is a schematic view illustrating a sputtering apparatus for forming a rear side electrode of a color filter substrate for an IPS mode LCD device according to the second embodiment of the present invention. In FIG. 5, the sputtering apparatus 270 has a reverse "C" shape path for the substrate 210 and includes first and second chambers 275 and 280. A first target 283 in the first chamber 275 and a second target 285 in the second chamber 280 include different target materials. Alternatively, the first target 283 in the first chamber 275 and the second target 285 in the second chamber 280 may include the same target material.

When the first target 283 in the first chamber 275 and the second target 285 in the second chamber 280 include different target materials, the first target 283 includes ITO or IZO and the second target 285 includes ZnO as a main component and two or three compounds having second or fourth valence. The substrate 210 is sequentially transferred into the first and second chambers 275 and 280 such that the first rear side electrode 213a (of FIG. 4B) and the second rear side electrode 213b (of FIG. 4B) are stacked on the substrate 210. When the rear side electrode 213 (of FIG. 4B) including the first rear side electrode 213a (of FIG. 4B) and the second rear side electrode 213b (of FIG. 4B) is formed on the substrate 210, an operating efficiency of the sputtering apparatus 270 is improved.

Referring again to FIG. 4B, the rear side electrode 213 includes the first rear side electrode 213a of ITO or IZO on the substrate 210 and the second rear side electrode 213b of a ZnO-based material on the first rear side electrode 213a. Alternatively, the rear side electrode may include a first rear side electrode of a ZnO-based material on the substrate and a second rear side electrode of ITO or IZO.

For example, when the first electrode of the ZnO-based material has a thickness of 150 angstroms and the second electrode of ITO has a thickness of 50 angstroms, the rear side electrode has an average transmissivity of 98.9% with respect to light having a wavelength range of 400 nm to 700 nm and a specific resistance of $260.0*10^{-4}$ $\Omega cm^{-1}$. Alternatively, when the first electrode of the ZnO-based material has a thickness of 100 angstroms and the second electrode of ITO has a thickness of 100 angstroms, the rear side electrode has an average transmissivity of 97.6% with respect to light having a wavelength range of 400 nm to 700 nm and a specific resistance of $15.3*10^{-4}$ $\Omega cm^{-1}$.

As mentioned above, the related art rear side electrode, which is formed of a single ITO layer and has a thickness of 200 angstroms, has an average transmissivity of 96.8% with respect to light having a wavelength range of 400 nm to 700 nm and a specific resistance of $3.7*10^{-4}$ $\Omega cm^{-1}$. Similarly to the first embodiment of the present invention, the rear side electrode 213 of the second embodiment has an improved transmissivity. But, the conductive property of the rear side electrode in the second embodiment is a little degraded. However, the rear side electrode for controlling the static electricity is required to have a specific resistance smaller than $500*10^{-4}$ $\Omega cm^{-1}$. Accordingly, there is no problem even if the rear side electrode in the present invention has a larger specific resistance with compared to the related art rear side electrode of ITO.

Next, in FIG. 4C, a black matrix 215, the color filter layer 220 and the overcoat layer 225 are sequentially formed on a second surface of the substrate 210 where the rear side electrode 213 is formed by processes explained in the first embodiment. The second surface is opposite to the first surface.

In the color filter substrate 250 for the IPS mode LCD device according to the second embodiment, one of the first and second rear side electrodes 213a and 213b is formed of ITO or IZO. However, the other one of the first and second rear side electrodes 213a and 213b is formed of the ZnO-based material, there is still an advantage in production cost.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:
1. A color filter substrate for an in-plane switching mode liquid crystal display device, comprising:
a first rear side electrode on a first surface of a substrate and formed of a first transparent conductive material including zinc oxide (ZnO) and at least two compounds comprising second or fourth valence, the first rear side electrode comprising a first thickness;

a black matrix comprising a lattice shape and a plurality of openings in the lattice shape, the black matrix disposed on a second surface, which is opposite to the first surface, of the substrate;

a color filter layer in the plurality of openings; and an overcoat layer on the black matrix and the color filter layer, wherein the first transparent conductive material includes ZnO of about 94.95 to about 98.79 weight %, $Al_2O_3$ of about 1 to about 3 weight %, $Ga_2O_3$ of about 0.2 to about 2 weight %, and CaO of about 0.01 to about 0.05 weight %.

2. The substrate according to claim 1, wherein the first thickness has a range of about 200 to about 300 angstroms.

3. A color filter substrate for an in-plane switching mode liquid crystal display device, comprising:

a first rear side electrode on a first surface of a substrate and formed of a first transparent conductive material including zinc oxide (ZnO) and at least two compounds comprising second or fourth valence, the first rear side electrode comprising a first thickness;

a black matrix comprising a lattice shape and a plurality of openings in the lattice shape, the black matrix disposed on a second surface, which is opposite to the first surface, of the substrate;

a color filter layer in the plurality of openings; and an overcoat layer on the black matrix and the color filter layer, wherein the first transparent conductive material includes ZnO of about 95 to about 98.8 weight %, $Al_2O_3$ of about 1 to about 3 weight %, and $Ga_2O_3$ of about 0.2 to about 2 weight %.

4. A color filter substrate for an in-plane switching mode liquid crystal display device, comprising:

a first rear side electrode on a first surface of a substrate and formed of a first transparent conductive material including zinc oxide (ZnO) and at least two compounds comprising second or fourth valence, the first rear side electrode comprising a first thickness;

a black matrix comprising a lattice shape and a plurality of openings in the lattice shape, the black matrix disposed on a second surface, which is opposite to the first surface, of the substrate;

a color filter layer in the plurality of openings;

an overcoat layer on the black matrix and the color filter layer; and a second rear side electrode formed of a second transparent conductive material of indium-tin-oxide (ITO) or indium-zinc-oxide (IZO) and comprising a second thickness, wherein the second rear side electrode is positioned between the second surface and the first rear side electrode, or the first rear side electrode is positioned between the second surface and the second rear side electrode.

5. The substrate according to claim 4, wherein:

the first thickness has a range of about 100 to about 250 angstroms; and the second thickness has a range of about 50 to about 100 angstroms.

6. The substrate according to claim 5, wherein a summation of the first and second thickness has a range of about 200 to about 300 angstroms.

7. The substrate according to claim 4, wherein the first transparent conductive material includes ZnO of about 94.95 to about 98.79 weight %, $Al_2O_3$ of about 1 to about 3 weight %, $Ga_2O_3$ of about 0.2 to about 2 weight %, and CaO of about 0.01 to about 0.05 weight %.

8. The substrate according to claim 4, wherein the first transparent conductive material includes ZnO of about 95 to about 98.8 weight %, $Al_2O_3$ of about 1 to about 3 weight %, and $Ga_2O_3$ of about 0.2 to about 2 weight %.

9. A method of fabricating a color filter substrate for an in-plane switching mode liquid crystal display device, the method comprising:

forming a first rear side electrode on a first surface of a substrate and formed of a first transparent conductive material including zinc oxide (ZnO) and at least two compounds comprising second or fourth valence, the first rear side electrode comprising a first thickness;

forming a black matrix comprising a lattice shape and a plurality of openings in the lattice shape, the black matrix disposed on a second surface, which is opposite to the first surface, of the substrate;

forming a color filter layer in the plurality of openings; and forming an overcoat layer on the black matrix and the color filter layer, wherein the first transparent conductive material includes ZnO of about 94.95 to about 98.79 weight %, $Al_2O_3$ of about 1 to about 3 weight %, $Ga_2O_3$ of about 0.2 to about 2 weight %, and CaO of about 0.01 to about 0.05 weight %.

10. The method according to claim 9, wherein the first thickness has a range of about 200 to about 300 angstroms.

11. A method of fabricating a color filter substrate for an in-plane switching mode liquid crystal display device, the method comprising:

forming a first rear side electrode on a first surface of a substrate and formed of a first transparent conductive material including zinc oxide (ZnO) and at least two compounds comprising second or fourth valence, the first rear side electrode comprising a first thickness;

forming a black matrix comprising a lattice shape and a plurality of openings in the lattice shape, the black matrix disposed on a second surface, which is opposite to the first surface, of the substrate;

forming a color filter layer in the plurality of openings; and forming an overcoat layer on the black matrix and the color filter layer, wherein the first transparent conductive material includes ZnO of about 95 to about 98.8 weight %, $Al_2O_3$ of about 1 to about 3 weight %, and $Ga_2O_3$ of about 0.2 to about 2 weight %.

12. A method of fabricating a color filter substrate for an in-plane switching mode liquid crystal display device, the method comprising:

forming a first rear side electrode on a first surface of a substrate and formed of a first transparent conductive material including zinc oxide (ZnO) and at least two compounds comprising second or fourth valence, the first rear side electrode comprising a first thickness;

forming a black matrix comprising a lattice shape and a plurality of openings in the lattice shape, the black matrix disposed on a second surface, which is opposite to the first surface, of the substrate;

forming a color filter layer in the plurality of openings; and forming an overcoat layer on the black matrix and the color filter layer, wherein forming a second rear side electrode, which is formed of a second transparent conductive material of indium-tin-oxide (ITO) or indium-zinc-oxide (IZO) and comprising a second thickness, is performed before forming the first rear side electrode such that the second rear side electrode is positioned between the second surface and the first rear side electrode, or is performed after forming the first rear side electrode such that the first rear side electrode positioned between the second surface and the second rear side electrode.

13. The method according to claim 12, wherein:

the first thickness has a range of about 100 to about 250 angstroms; and the second thickness has a range of about 50 to about 100 angstroms.

14. The method according to claim 13, wherein a summation of the first and second thickness has a range of about 200 to about 300 angstroms.

15. The method according to claim 12, wherein the first transparent conductive material includes ZnO of about 94.95 to about 98.79 weight %, $Al_2O_3$ of about 1 to about 3 weight %, $Ga_2O_3$ of about 0.2 to about 2 weight %, and CaO of about 0.01 to about 0.05 weight %.

16. The method according to claim 12, wherein the first transparent conductive material includes ZnO of about 95 to about 98.8 weight %, $Al_2O_3$ of about 1 to about 3 weight %, and $Ga_2O_3$ of about 0.2 to about 2 weight %.

* * * * *